Figure 1:
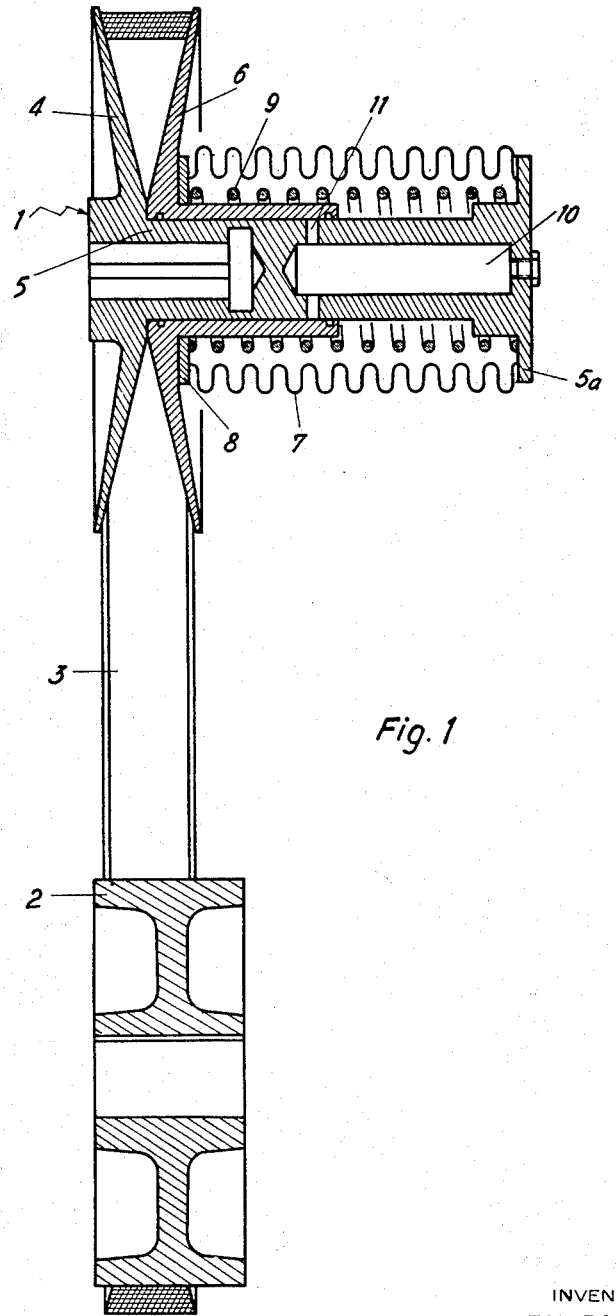

United States Patent Office 3,177,734
Patented Apr. 13, 1965

3,177,734
VARIABLE-SPEED TRANSMISSIONS UTILIZING BELTS AND PULLEYS
Jean Rackelboom, Saint-Mande, France, assignor to CIDMA, Courbevoie, Seine, France
Filed July 29, 1963, Ser. No. 298,073
Claims priority, application France, Sept. 4, 1962, 908,549; May 22, 1963, 935,796
7 Claims. (Cl. 74—230.17)

This invention relates to variable-speed transmissions utilizing belts and pulleys, and pertains more particularly to transmissions of this type which include at least one grooved pulley formed by two flanges of which one is longitudinally movable whereby to provide variable-speed transmission. Such flanges are usually frusto-conical and cooperate with a trapezium-shaped belt.

The movable flange is angularly coupled with the driving or driven shaft through drive means, which, when recourse is had to such well-known solutions as keying, splining or the like, require a minimum clearance between the members and parts subjected to relative movement, in order not to hamper longitudinal motion of the movable flange. Such functional clearances inevitably lead to vibration phenomena when said members and parts come into mutual contact, and these phenomena in turn result in oxidation and corrosion of the driving parts.

It is the principal object of the present invention to provide means for driving the movable flange whereby the functional drawbacks referred to precedingly can be overcome.

Accordingly, a movable flange in accordance with the invention is loosely mounted on a member connected to the stationary flange and is rotated by a diaphragm or bellows, or like element adapted to be deformed in parallelism with its axis of symmetry but which undergoes only negligible deformation in response to tangential forces, said member being connected to both the movable flange and the stationary flange, and means being provided to constantly urge said movable flange towards said stationary flange. The diaphragm which rotates the movable flange allows the same to shift longitudinally of itself whereby to vary the transmission ratio.

The means which constantly urge the movable flange towards the stationary flange could consist of a spring placed within the bellows or the diaphragm.

However, in accordance with one specific embodiment of the invention, the two functions of driving the flange and urging it towards the stationary flange are fulfilled by the same member, which member consists of a helical spring adapted to become deformed in parallelism with its axis but to sustain only negligible deformation in response to tangential forces. A spring of this type, which sustains virtually no deformation when working in torsion, is preferably formed of square- or rectangular-section turns in such manner that the moments of inertia of the sections with respect to the two directions under consideration (axial and tangential) satisfy the specified requirements.

In all cases variations in the transmission are obtained by varying the centre distance between the driving and driven shafts, one at least of which is equipped with a grooved pulley as hereinbefore defined.

In accordance with another embodiment of the invention, the constant urging of the movable flange towards the stationary flange whereby to exert pressure against the sides of the pulley belt is ensured by hydraulic pressure and such pressure can be remote-controlled for the purpose of varying the spacing between the flanges.

It is likewise of advantage to combine two pulleys according to the invention, mounting one on the driving shaft and the other on the driven shaft, at least one of said pulleys being provided with hydraulic control means. In this particular case, variations in the transmission are obtained by variations in the hydraulic control means, without the need to modify the centre distance between the driving and driven shafts, thereby providing a remote-controlled variable transmission with fixed centre distance.

In a preferred embodiment, sealing is provided by the diaphragm which serves to transmit rotating motion to the movable flange.

Generally speaking, it is preferable to provide a reserve supply of oil for continuous lubrication of the sliding motion of the movable flange. When a hydraulic control is utilized, the lubrication can be provided in notably simple fashion by the very fluid which is used to exert the necessary pressure on the movable flange.

Figure 2:
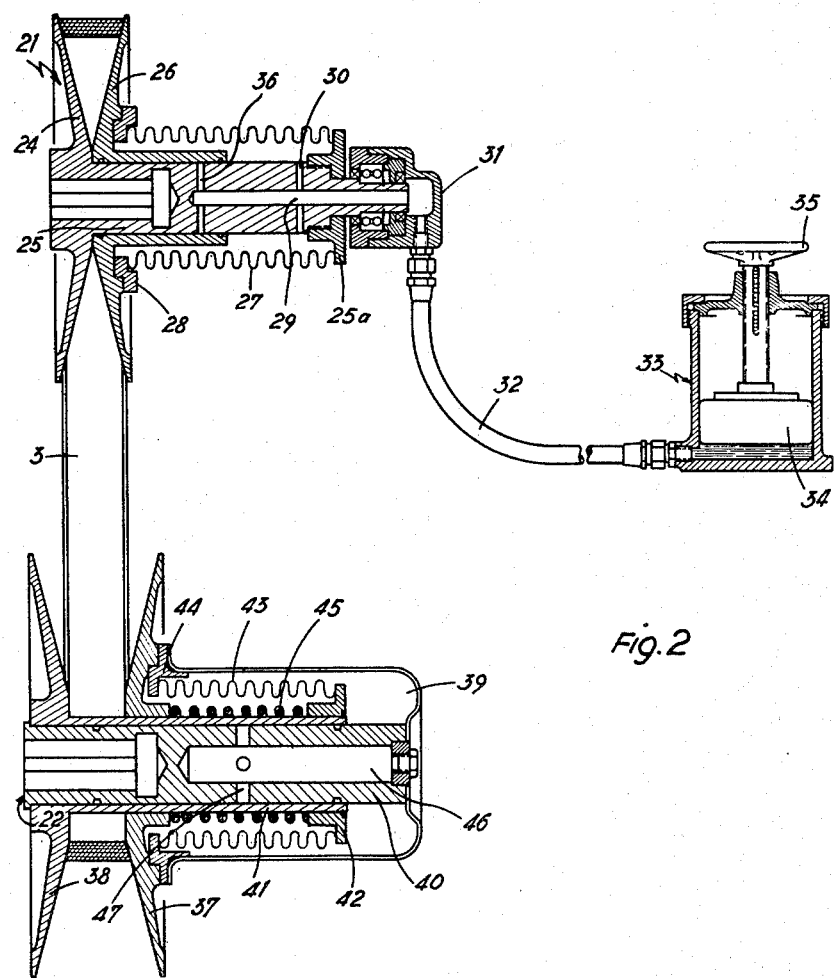
Figure 3:
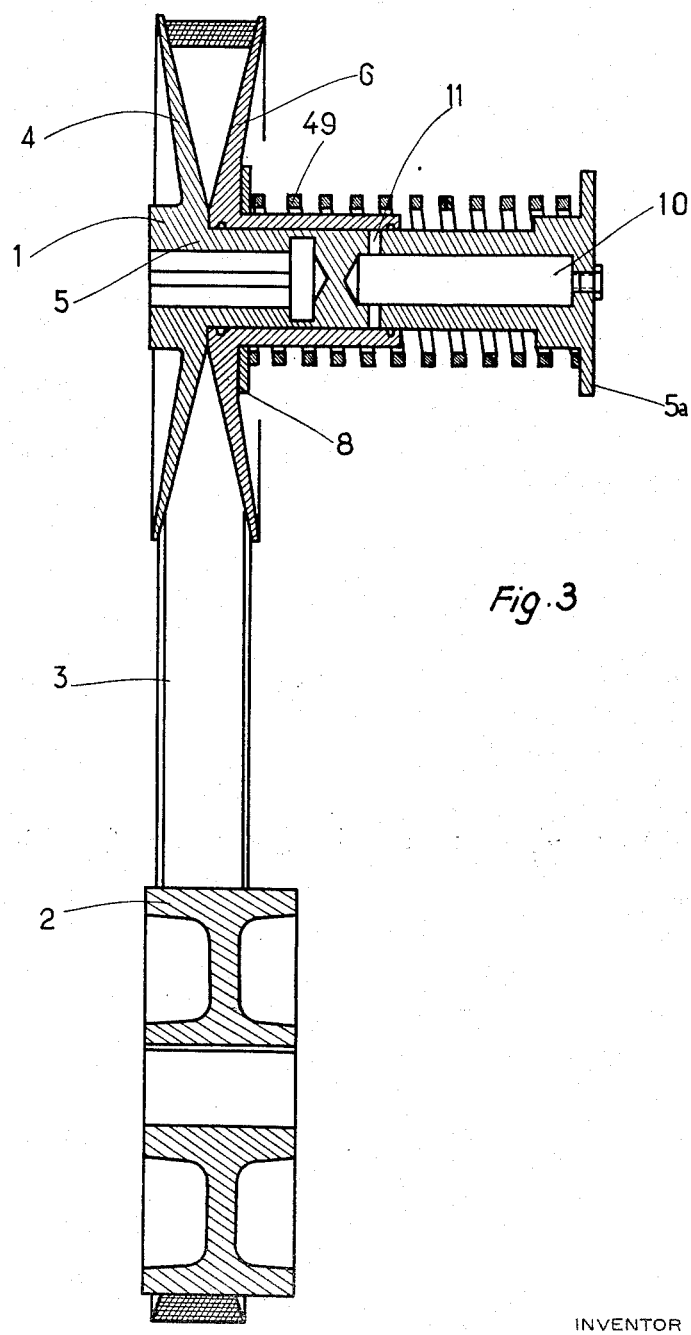

Other features of the invention, together with the foregoing, will become apparent from the following description given with reference to the accompanying drawing, which is filed by way of example and not of limitation and in which:

FIGURE 1 shows in axial section an embodiment of a variable transmission according to the invention;
FIGURE 2 is a corresponding view of an alternative embodiment; and
FIGURE 3 is a view corresponding to FIGURE 1 of yet another alternative embodiment.

Referring first to FIGURE 1, the variable-speed transmission system shown thereon consists basically of a driving pulley 1 with frusto-conical flanges, a driven pulley 2, and a trapezium-shaped belt 3 running over pulleys 1 and 2.

Driving pulley 1 includes a stationary frusto-conical flange 4, the hub 5 of which is rigid with a driving shaft (not shown), and a movable frusto-conical flange 6 mounted loosely on hub 5. Flange 6 is driven by a diaphragm or bellows 7 one end of which is rigid with a web 5a of hub 5 and the other end rigid with an annular plate 8 secured to flange 6. In addition, elastic means are provided to constantly urge the movable flange towards the stationary flange, thereby exerting a pressure which is transmitted to the sides of trapezium-shaped belt 3 whereby to hug the latter between the two flanges. By way of example, said hub may comprise a spring 9 placed within diaphragm 7 and bearing against the web 5a at one end and against annular plate 8 at the other.

It is preferable to provide a reserve supply of oil 10 within the hub 5 of the stationary flange to ensure lubrication for the sliding motion of the movable flange (through oil-ways 11 for instance), thereby obviating any risk of seizure. The oil in the supply 10 is urged by centrifugal force towards the cylindrical surface of hub 5 over which movable flange 6 slides.

The driven pulley 2 is mounted on a driven shaft (not shown) and the centre distance between the driving and driven shafts is rendered variable to permit varying the transmission speed. The power unit is accordingly mounted on a supporting base which can be adjusted with respect to the driven shaft.

As said centre distance varies, the centre-plane of the belt moves in parallelism with the pulley axes, the side of the belt which is in contact with the stationary flange sliding along the generatrix thereof. The driven pulley 2 must therefore have a flat rim over which the inner face of the belt is freely slidable.

In the specific embodiment shown in FIGURE 2, both the driving pulley 21 and the driven pulley 22 have grooves and are mounted on driving and driven shafts, respectively, the centre distance between which is fixed. The driving pulley includes a further stationary frusto-conical flange 24 the hub 25 of which is rigid with the driving shaft (not shown) and a moving frusto-conical flange 26 loosely mounted on hub 25. The flange 26 is rotated by a diaphragm or bellows 27 one end of which is rigidly connected to a web 25a mounted on hub 25 and the other end rigidly connected to a ring 28 fixed to flange 26.

Hub 25 is provided with a bore 29 which has port through ducts 30 in the space located between said hub and diaphragm 27. A rotary seal 31 mounted on the end of the hub permits connecting the bore 29 to a flexible line 32 for conveying oil from an independent actuating cylinder 33 which is associated with a piston 34 and an operating wheel 35.

Injection of oil under pressure moves flange 26 longitudinally which transmits pressure against the sides of trapezium-shaped belt 3.

It is to be noted that hub 25 is drilled with radial oilways 36 communicating with bore 29, which bore is filled with oil in order to provide sliding lubrication of movable flange 26 and thereby avoid any danger of seizure.

The driven pulley is comprised of a stationary flange 37 and a movable flange 38, the mutual positions of which are the reverse of those of the driving pulley flanges. The stationary flange is rigid with a casing 39 which is supported on a core-piece 40 secured to the driven shaft (not shown). The movable flange 38 is extended by an outrigger bush 41 mounted loosely on core-piece 40 and terminating in a flange 42. The stationary flange is rotated by a diaphragm or bellows 43 one end of which is rigid with flange 42 and the other with a ring 44 fixed to flange 37.

An elastic means such as a spring 45 bearing at one end against the hub of stationary flange 37 and at the other end against flange 42, permits displacing movable flange 38 by constantly urging the same against the sides of the trapezium-shaped belt.

In addition, a reserve supply of oil 46 is provided within core-piece 40 in order to ensure constant sliding lubrication, through oilways such as 47, of the hub of the movable flange over the core-piece and thereby avoid seizing.

As stated precedingly, in this specific embodiment the centre distance between the driving and driven shafts is fixed. Operation of the wheel 35 connected to the actuating piston 34 of the oil cylinder 33 causes movable flange 26 to be displaced relative to the stationary flange 24 of the driving pulley, and belt 3 to be consequently displaced between these flanges. Since the centre distance between the pulley is fixed and the length of the belt constant, movable flange 38 of the driven pulley is caused to move relative to the stationary flange 37 in order to maintain the length and the tension in the belt constant.

It will of course be understood that the disposition of the various parts must be such that maximum spacing between the flanges of one of the pulleys is obtained when the spacing between the flanges of the other pulley is minimum, in order to ensure that the centre-plane of the belt remains at all times perpendicular to the axes.

Thus, in the case of a groove-type pulley, the torque is transmitted from the stationary flange to the movable flange through a diaphragm or bellows adapted to enable the movable flange to slide freely in response to a spring or to hydraulic pressure means for example. In addition, the diaphragm ensures the necessary leaktightness which permits possibly providing constant and leakproof lubrication of the sliding action and also an associated hydraulic control means.

The drive through a diaphragm or a bellows dispenses with the need for such means of rigid connection as keys, driving pegs and the like, which, by reason of the clearance needed between the mutually displaced members and parts to permit free longitudinal travel of the moving flange, are subjected to vibration phenomena which result in oxidation and corrosion of the driving parts.

A hydraulically controlled displacement of the movable flange permits and facilitates the provision of remote control of the speed variation.

Referring lastly to the embodiment shown in FIGURE 3, which corresponds to that of FIGURE 1, flange 6 is rotated by a helical spring 49 of square- or rectangular-section, one end of which is rigidly connected to an annular plate 8 fixed to flange 6 and the other end rigidly connected to the web 5a fixed to hub 5. This spring has a dual function: it enables flange 6 to be rotated by flange 4 and it constantly urges the movable flange towards the stationary flange, thereby exerting a pressure which is transmitted to the sides of the trapezium-shaped belt 3 whereby to cause the same to be hugged between the two flanges.

To the transmission device hereinbefore described can be added a bellows made of rubber (not shown) or any other elastic material, which bellows is rigidly connected at one end to plate 8 and at the other to web 5a. Its purpose is to protect the contact surface between the stationary flange and the movable flange from dust and dampness, in order to ensure satisfactory operation of the transmission and at the same time prevent oil from being splattered from the oil supply 10 provided within hub 5 for constantly lubricating the sliding motion (via oilways such as 11).

It is to be noted that the provision of such a diaphragm is optional and that it can be dispensed with entirely or else replaced by any other convenient means such as a sealed enclosure rigid with the movable flange.

Obviously, this alternative method of construction is likewise applicable to the embodiment shown in FIGURE 2.

It is of course to be understood that many modifications and substitutions of parts can be made to the specific embodiments hereinbefore described, without departing from the scope of the invention. By way of example, in the driven pulley of FIGURE 2 the spring could be replaced by a hydraulic system similar to the one described in respect of the driving pulley. Similarly, the design of the driven pulley could be simplified and be similar to that of the driving pulley, provided that the driven shaft can be positioned on the other side of the latter mentioned pulley.

What is claimed is:

1. A variable-speed transmission comprising a belt and pulleys, including one shaft, at least one grooved pulley mounted on said shaft and formed of two flanges, one of which is stationary with respect to said shaft and the other is movable with respect thereto, spring means to continuously urge said movable flange towards said stationary flange, and a connecting member connecting both flanges, said member being symmetrically disposed around an axis of symmetry aligned with said shaft, and being adapted to deform in parallelism with its axis of symmetry but to sustain only negligible deformation in response to tangential forces whereby said connection member itself transmits the rotation of one of said flanges to the other.

2. A transmission system as claimed in claim 1, wherein said connection member is a metallic membrane.

3. A transmission system as claimed in claim 1, wherein said connection member is a metallic bellows.

4. A transmission system as claimed in claim 1, further comprising means to lubricate the sliding motion of said movable flange.

5. A variable-speed transmission comprising a belt and pulleys, including one shaft, at least one grooved pulley mounted on said shaft and formed of two flanges, one of which is stationary with respect to said shaft and the other is movable with respect thereto, a connecting member connecting both flanges, said member being symmetrically disposed around an axis of symmetry aligned with said shaft and being adapted to deform in parallelism with its axis of symmetry but to sustain only negligible deformation in response to tangential forces whereby said connecting member itself transmits the rotation of one of said flanges to the other, and hydraulic means to displace said movable flange relatively to said stationary flange, in a direction parallel to said shaft.

6. A variable-speed transmission comprising a belt and pulleys, including one shaft, at least one grooved pulley mounted on said shaft and formed of two flanges, one of which is stationary with respect to said shaft and the other is movable with respect thereto, a connecting member connecting both flanges, said member being symmetrically disposed around an axis of symmetry aligned with said shaft and being adapted to deform in parallelism with its axis of symmetry but to sustain only negligible deformation in response to tangential forces whereby said connecting member itself transmits the rotation of one of said flanges to the other, said connecting member constituting the peripherical wall of a fluid tight chamber in which a fluid under pressure is introduced to displace said movable flange relatively to said stationary flange in a direction parallel to said shaft.

7. A transmission system as in claim 6, wherein said fluid is a lubricant for the relative movement of said movable flange relatively to said stationary flange.

References Cited by the Examiner
UNITED STATES PATENTS

| | | |
|---|---|---|
| 1,416,745 | 5/22 | Peters. |
| 2,463,031 | 3/49 | Hallinan. |
| 2,543,967 | 3/51 | Heyer. |
| 2,893,254 | 7/59 | Grover. |
| 2,973,655 | 3/61 | Rix. |
| 2,983,157 | 3/61 | Pokorny. |

FOREIGN PATENTS

| | | |
|---|---|---|
| 921,462 | 1/47 | France. |

DON A. WAITE, *Primary Examiner.*